(12) United States Patent
Kerspe et al.

(10) Patent No.: US 10,421,345 B2
(45) Date of Patent: Sep. 24, 2019

(54) ELECTRIC TRUCK

(71) Applicants: KOENIG METALL GmbH & Co. KG, Gaggenau (DE); Jobst H. Kerspe, Mauer (DE)

(72) Inventors: Jobst H. Kerspe, Mauer (DE); Michael Fischer, Gaggenau (DE); Juergen Erhardt, Stuttgart (DE)

(73) Assignees: KOENIG METALL GmbH & Co. KG, Gaggenau (DE); Jobst H. Kerspe, Mauer (DE)

( * ) Notice: Subject to any disclaimer, the term of this patent is extended or adjusted under 35 U.S.C. 154(b) by 0 days.

(21) Appl. No.: 15/687,714

(22) Filed: Aug. 28, 2017

(65) Prior Publication Data

US 2018/0056769 A1 Mar. 1, 2018

(30) Foreign Application Priority Data

Aug. 29, 2016 (DE) .................. 10 2016 116 017
Feb. 2, 2017 (DE) .................. 10 2017 102 064

(51) Int. Cl.
*B60K 1/04* (2019.01)
*B60H 1/00* (2006.01)
(Continued)

(52) U.S. Cl.
CPC ............... *B60K 1/04* (2013.01); *B60H 1/005* (2013.01); *B60H 1/00014* (2013.01); *B60H 1/00364* (2013.01); *B60H 1/00535* (2013.01); *B60L 1/02* (2013.01); *B60L 3/0015* (2013.01); *B60L 50/64* (2019.02); *B60L 50/66* (2019.02); *B60P 3/20* (2013.01); *B62D 33/048* (2013.01); *G07C 5/008* (2013.01); *H01M 2/1077* (2013.01); *H01M 2/1083* (2013.01); *H01M 10/465* (2013.01);
(Continued)

(58) Field of Classification Search
CPC .............. B60K 1/04; B60K 2001/0405; B60K 2001/0416; B60K 2001/0438; B60K 2001/0444; B60K 2001/0477
See application file for complete search history.

(56) References Cited

U.S. PATENT DOCUMENTS 5,181,389 A * 1/1993 Hanson .............. B60H 1/00985
340/589
5,585,205 A * 12/1996 Kohchi ................. B60K 1/04
180/65.1

(Continued)

*Primary Examiner* — Brian L Swenson
(74) *Attorney, Agent, or Firm* — Collard & Roe, P.C.

(57) ABSTRACT

An electric truck has a chassis, on which a driver's cab with a motor compartment containing an electric motor is disposed in the front of the electric truck, and in the rear a cargo body rests on the chassis. The cargo body substructure sits on vehicle longitudinal beams of the chassis. The cargo body bottom sealing the cargo body on the underside is spaced above the vehicle longitudinal beams to ensure clearance for a sufficient spring travel. A battery housing with at least one integrated battery is disposed in the intermediate space between the vehicle longitudinal beams and the body bottom, so that a larger installation space is available for the batteries and therefore a greater range for the electric truck. The battery is protected in this region and, moreover, the insulation of the battery housing simultaneously contributes to insulation of the cargo body disposed above the battery housing.

22 Claims, 3 Drawing Sheets

(51) Int. Cl.
*B60P 3/20* (2006.01)
*B62D 33/04* (2006.01)
*G07C 5/00* (2006.01)
*H01M 2/10* (2006.01)
*H01M 10/46* (2006.01)
*B60L 1/02* (2006.01)
*B60L 3/00* (2019.01)
*B60L 50/60* (2019.01)
*B60L 50/64* (2019.01)
*H02S 40/38* (2014.01)
*B60K 1/00* (2006.01)
*B60K 7/00* (2006.01)

(52) U.S. Cl.
CPC .............. *B60K 1/00* (2013.01); *B60K 7/0007* (2013.01); *B60K 2001/001* (2013.01); *B60K 2001/0416* (2013.01); *B60K 2001/0438* (2013.01); *B60K 2001/0461* (2013.01); *B60Y 2200/14* (2013.01); *B60Y 2200/141* (2013.01); *H01M 2220/20* (2013.01); *H02S 40/38* (2014.12)

(56) References Cited

U.S. PATENT DOCUMENTS

| | | | |
|---|---|---|---|
| 6,470,821 B1 * | 10/2002 | Hagopian | G01D 5/10 116/266 |
| 7,338,335 B1 * | 3/2008 | Messano | B60G 13/14 180/65.22 |
| 9,108,691 B2 * | 8/2015 | Fanourakis | B60W 20/15 |
| 9,162,654 B2 * | 10/2015 | Moller | B60K 1/04 |
| 9,586,458 B2 * | 3/2017 | Larson | B60H 1/00014 |
| 9,630,502 B2 * | 4/2017 | Chen | B60L 1/003 |
| 9,797,645 B2 * | 10/2017 | Youbi-Idrissi | B60H 1/3202 |
| 2008/0148748 A1 * | 6/2008 | Viegas | B60P 3/20 62/151 |
| 2011/0017527 A1 * | 1/2011 | Oriet | B60K 1/04 180/65.1 |
| 2013/0017361 A1 * | 1/2013 | Thiagarajan | E04C 2/543 428/117 |
| 2013/0115496 A1 * | 5/2013 | Mack | H01M 2/1061 429/98 |

* cited by examiner

ELECTRIC TRUCK

CROSS REFERENCE TO RELATED APPLICATIONS

Applicants claim priority under 35 U.S.C. § 119 of German Application No. 10 2016 116 017.2 filed Aug. 29, 2016 and German Application No. 10 2017 102 064.0 filed Feb. 2, 2017, the disclosures of which are incorporated by reference.

BACKGROUND OF THE INVENTION

1. Field of the Invention

The invention relates to an electric truck with a chassis, on which a driver's cab with a motor compartment containing an electric motor is disposed in the front region of the electric truck, and in the rear region a cargo body rests on the chassis of the electric truck, wherein the substructure of the cargo body is seated on the vehicle longitudinal beams of the chassis and wherein the body bottom of the cargo body sealing the cargo body on the underside is disposed with spacing above the vehicle longitudinal beams to ensure clearance for a sufficient spring travel.

2. Description of the Related Art

Such electric trucks are known in particular for the inner-city delivery and distribution traffic. For example, such electric trucks are used for mail and parcel delivery. The need for such all-electric-powered small trucks in the range between 3.5 and 7.5 metric tons will grow considerably in the coming years, because many inner cities are exposed, not only due to the fine-dust pollution, nitrogen oxides pollution, especially due to diesel vehicles, but also due to the resulting noise pollution, to considerable impairments and health hazards, and so now even temporary bans on travel are being considered. Compared with the conventional truck traffic with use of combustion engines, electric trucks offer the advantage that the said pollutions are completely nonexistent or at least are banished from the inner-city region. In a first expansion stage, trucks in use at present are either being retrofitted completely with electric-motor drives or else are being equipped as hybrid vehicles with additional electric motors. The results achieved heretofore in this connection are unsatisfactory, because the vehicles are usually too heavy for a permanent electrical operation, the battery capacities available in this connection are too small and, in other respects, especially in the food sector, a considerable additional energy demand for maintenance of the refrigeration exists, but can be met only with difficulty by electric vehicles.

Such a truck usually consists of a chassis, on which the driver's cab as well as a body structure for formation of a cargo space are disposed. In detail, the chassis delivered by the manufacturer comprises the driver's cab, the longitudinal beams for support for the cargo body, although it is not part of the chassis, as well as the axles. All further attachments and expansions are then made individually. In this connection, the cargo body is usually not disposed to rest directly on the chassis, but rather is disposed with a distinct spacing above the chassis, in order to provide sufficient spring travel for the wheels of the truck. In the region between the body bottom sealing the cargo body on the underside and the vehicle chassis, a comparatively large-volume and unused space is therefore usually present. Furthermore, the described vehicle substructure is also relevant to weight.

In retrofitted vehicles, the batteries necessary for operation of electric trucks are usually disposed in the region in which the fuel tank for the operation of the combustion engine was otherwise mounted. In view of the limited space requirement available in this connection, the battery position selected in this respect is unfavorable. Moreover, the batteries used for powering electric trucks must be equipped with additional safety features, such as crash protection, for example, which in turn requires additional structural measures and in other respects leads to an increased vehicle weight, which in turn must be paid for with an increased energy demand.

SUMMARY OF THE INVENTION

Starting from this prior art, the task underlying the invention is to provide a refrigerated vehicle that is as lightweight as possible, with an optimized utilization of space for the all-electric operation, especially in the inner-city region.

The task underlying the invention is accomplished by an electric truck having the features according to the invention. Advantageous improvements of the invention may be inferred from discussion below.

According to one aspect of the invention, a battery housing with at least one integrated battery is disposed in the intermediate space between the vehicle longitudinal beam and the body bottom of the cargo body. This arrangement has firstly the advantage that a sufficient volume for larger battery units is also available in this region. In other respects the arrangement of the battery units in this region has the advantage that the batteries can be disposed uniformly underneath the body bottom and thus a considerable weight is positioned underneath the cargo level of the electric truck, which contributes both to an improvement of the roadholding and of the spring comfort of the truck. In this connection, battery housing and cargo body form a mutually associated unit in such a way that the body bottom of the cargo body is simultaneously the surface of the battery housing. This feature is made possible by the battery housing being adapted to the load transfer necessary in this connection, for example because the battery housing represents a so-called braced vacuum insulation. Accordingly, the battery housing is of at least double-walled construction, with a vacuum-tight shell, which is evacuated. Furthermore, this battery wall is completely filled with a microporous or nanoporous structure. Depending on design of this structure, this filler has more or less loadable bracing function, which in the application presented here ensures that any input forces or moments can be absorbed or dissipated into the chassis, preferably without need for further bracing elements. Therefore it is possible for the upper side of the battery housing to form the body bottom of the cargo body.

In alternative configuration, the battery housing may also be disposed between the vehicle longitudinal beams. This arrangement has the advantage of an improved side-impact protection for the battery housing and especially for the battery or batteries received in this housing. Moreover, the center of gravity of the electric truck is lowered and thus the vehicle safety is improved on the whole. In other respects, the space available in connection with the vehicle construction is better utilized.

The vacuum insulation of the battery housing achieved in both embodiments has advantages not only in regard to the batteries disposed in the battery housing but at the same time also represents, underneath the body bottom of the cargo body, an efficient thermal insulation, which protects the cargo of the truck from the heat radiation of the pavement, especially in summer. In other respects, the battery housing therefore simultaneously represents a crash-safe shell for the batteries received in the battery housing, and so, against the background of the arrangement of the battery housing above the vehicle longitudinal beams, an extensive side-impact protection is already achieved for the batteries received in the battery housing. If necessary, an additional stone-impact protection, for example in the form of fiber mats, which have stable toughness and/or dimensions, may be disposed underneath the platform of the battery housing.

The electric motor necessary for the drive of the electric truck may be disposed either in the front region of the electric truck and/or underneath the driver's cab in a motor compartment provided for the purpose. Alternatively, such an electric truck may also be driven with one or more hub motors known in itself or themselves, which motor or which motors may then be disposed in one or in both vehicle axles of the electric truck, so that in this case additional space is then available in the region of the driver's cab for other applications and accessories of the electric truck.

In advantageous configuration, several batteries, preferably three batteries, may be disposed in this battery housing underneath the body bottom, so that the battery housings rest directly on the vehicle longitudinal beams. The use of several separate batteries has the advantage that hereby only individual batteries that have been charged in the meantime must be exchanged if necessary in the region of charging stations, so that the retrofitting time and effort needed in this respect is comparatively small. In other respects, for reasons of economy of weight, batteries adapted to the respective travel distance may also be used, or the total volume available in the battery housing does not have to be completely utilized, and so this possibility represents a contribution to reduction of the weight of the vehicle.

In the embodiment in which the battery housing is disposed between the vehicle longitudinal beams, several batteries may likewise be disposed in the battery housing, in which case the battery housing is disposed in such a way between the vehicle longitudinal beams that it projects above and below the vehicle longitudinal beams.

In addition, the individual batteries may also be disposed separated from one another by housing partitions. This arrangement is practical in particular when batteries usually operated at different temperature levels are being used.

In connection with the embodiment of the electric truck in such a way that several batteries are disposed in the battery housing, it has proved effective to group selected batteries as battery modules as well as to receive the individual batteries and/or the batteries grouped as battery modules interlockingly in one cage each, in order to increase the crash safety of the vehicles.

For reasons of economy of weight, the cages are made of lightweight, glass-fiber-reinforced plastic, abbreviated as GFRP. The cages themselves are secured inside the battery housing by adhesive bonding and/or are grouped in a larger cage unit, which in turn is adhesively bonded in the battery housing.

Both the larger cage unit and the cages may be additionally secured interlockingly and frictionally with clamping elements braced against the battery housing.

In this connection, it has proved to be practical when the battery housing is subdivided into several units, i.e. into several withdrawable units, so that the individual batteries in the respective withdrawable units can be easily inserted, in which case the withdrawable units are advantageously equipped with appropriate plug contacts, so that the inserted batteries can be easily connected via the plug contacts disposed in the battery housing. The subdivision of the battery housing into several withdrawable units separated from one another has the advantage that different battery configurations, for example high-voltage batteries, which can be connected with the drive train of the vehicle, or low-voltage batteries for powering the vehicle electronics of the vehicle, can be used in the individual withdrawable units.

In an advantageous improvement of this solution, the separate withdrawable units of the battery housing are respectively equipped with individual plug couplings for connection of the corresponding batteries, in which case the batteries themselves are in turn equipped with corresponding plugs, so that it is technically ensured that the battery applicable for the respective voltage level is also connected in the respectively applicable withdrawable unit, because the plugs provided for this purpose are designed to fit only the respectively corresponding plug couplings.

In a further improved embodiment, the battery housing is constructed as an insulating housing with a double wall. For this purpose, a porous, preferably microporous or nanoporous filling material, which is evacuated with formation of an at least slight vacuum, is disposed between the inner and outer wall of the battery housing. Furthermore, the filling material has a bracing function. Accordingly, the battery housing on the whole achieves a braced vacuum insulation.

The cargo body itself is likewise advantageously formed as a sandwich element, in such a way that its side walls, top element and/or its liftgate likewise respectively have an inner and an outer wall, between which a braced vacuum insulation is likewise respectively disposed. Thus an efficient thermal insulation is also achieved in this region, which in turn ensures that the energy expenditure for maintaining a constant temperature inside the cargo body, suitable for food transportation, for example, is greatly reduced. In other respects, such braced vacuum insulations can be manufactured with a comparatively light weight expenditure.

The liftgate is usually matched, in association with such trucks, to the respective application, so that if necessary the liftgate can be part of the chassis or else even part of the cargo body itself. This variation option also exists in conjunction with the electric trucks according to the invention.

For refrigeration of the cargo body, especially the inner face of the cargo body facing the driver's cab of the electric truck is equipped on the inside wall with a refrigerating surface, which permits efficient refrigeration of the cargo body by virtue of its large surface area.

In yet another advantageous improvement, the sandwich structure of the cargo body is made completely or partly in lightweight construction, for example of honeycomb or rod elements, wherein the internal honeycomb structure is filled with lightweight nanoporous insulating granules and furthermore the honeycomb structure is lined on both sides with cover panels for formation of the sandwich element. This arrangement in turn also represents a passive measure for maintenance of the temperature desired inside the cargo body, which is paid for with a comparatively small additional weight, which causes only a small additional energy demand, especially in comparison with the reduced energy demand for refrigeration of the cargo body.

In this connection, the refrigerating unit or units associated with the cargo body are disposed on the roof of the driver's cab of the electric truck, so that the exhaust heat of the refrigerating unit is delivered not to the interior of the cargo body but instead to the environment of the electric truck. This exhaust heat may also be used if necessary for climate control of the driver's cab. Alternatively, the refrigerating units may also be disposed in the battery withdrawable units or at least in their proximity. In this case, it is also conceivable to integrate the refrigerating units disposed in the proximity of the batteries in the thermal management of the batteries also.

Furthermore, the exhaust heat produced in connection with the climate control of the cargo body can be stored in appropriate storage elements, which, for example may likewise be disposed in the battery housing. This possibility is also true for the exothermic heat produced during operation of the batteries, which may likewise be stored temporarily at this point or be used for heating of the driver's cab. In other respects, this heat may also be used to heat the batteries at low environmental temperature, for example below 10 degrees C., in such a way that the cells receive high charging currents—for example during regenerative operation of the vehicle.

During charging operation of the batteries used in conjunction with the electric truck, so-called phase-change-material (PCM) batteries can be used and charged in the battery housing, which batteries then contribute during travel operation to refrigeration of the cargo body by releasing their refrigeration energy to the cargo body via suitable heat exchangers.

In addition, regenerative refrigeration elements, preferably on zeolite/water basis, may be associated with the cargo body of the electric truck, in order to contribute in this way to refrigeration of the cargo body without additional energy demand from the vehicle battery during travel.

Especially in winter, requirements in which the cargo body of the electric truck must be heated are also conceivable. In this connection, it has proved effective to dispose, in the wall elements and/or the body bottom of the cargo body, regenerative heat accumulators and/or electrical heating elements. These devices are then supplied from the heat accumulators disposed in the battery housing.

In yet another improved configuration, the side walls and/or the roof element of the cargo body may be lined on the outside with solar modules, so that a recharging of the batteries received in the battery housing is ensured by means of these solar modules during travel operation, so that hereby the range of the electric truck can be improved.

In further improved embodiment, the electric truck is provided with a data-acquisition unit, which in particular senses the respective location of the electric truck, its battery condition, the internal temperature of the cargo body and/or further vehicle data and thereafter transmits them wirelessly, preferably via telemetry, to a central computer, which is used on the whole for control of the vehicle fleet. Hereby, by way of a rational and computer-assisted fleet management, for example in conjunction with a tracking function, the travel distance of the electric trucks can be adapted respectively to their current range and thus a further optimization of the energy consumption, in this case covering the entire fleet, can be ensured.

BRIEF DESCRIPTION OF THE DRAWINGS

Other objects and features of the invention will become apparent from the following detailed description considered in connection with the accompanying drawings. It is to be understood, however, that the drawings are designed as an illustration only and not as a definition of the limits of the invention.

In the drawings.

DETAILED DESCRIPTION OF PREFERRED EMBODIMENTS

Figure 1:
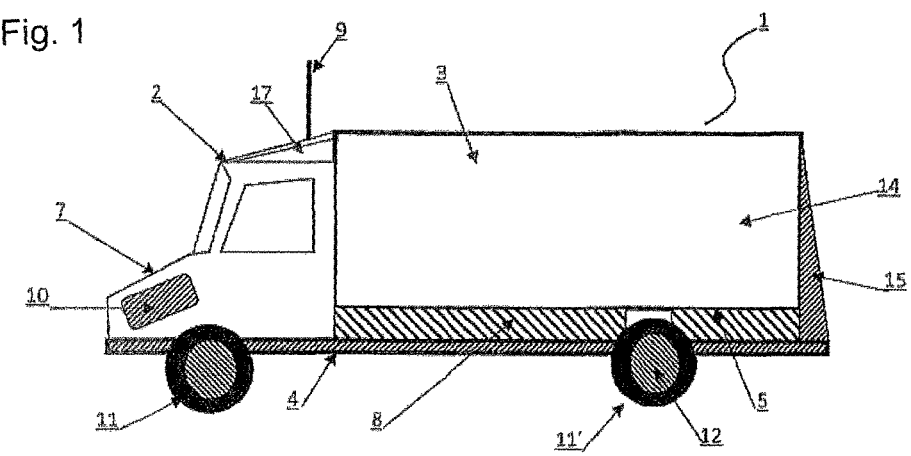
FIG. 1 shows an electric truck with a cargo body in a side view with battery housing resting on the vehicle longitudinal beams.

FIG. 1 shows an electric truck 1 with a driver's cab 2 and a cargo body 3, which respectively rest on the vehicle longitudinal beams 4 disposed on both sides of the electric truck 1, wherein a battery housing 8 with several withdrawable units for in total three batteries 6, 6', 6" in this exemplary embodiment is disposed underneath the body bottom 5 extending under the cargo body 3. Properly understood, the body bottom 5 is simultaneously the surface of the battery housing. Cargo body 3 and battery housing 8 therefore represent a closed unit.

In this connection, a regulated electric motor 10 is disposed in the motor compartment 7 disposed in front of and underneath the driver's cab 2. Alternatively, wheel-hub motors 12 respectively powered directly by the batteries 6, 6', 6" disposed in the battery housing 8 may also be associated with the wheels 11, 11' of the electric truck 1. The cargo body 3 is bounded by a front wall 13 (FIG. 2) facing the driver's cab 2, two side walls 14 on both sides as well as by a liftgate 15 disposed away from the driver's cab 2 and a top element 16 (FIG. 2) sealing the cargo body 3 on the upper side. Both the side walls 14 and the top element 16 may be lined in a way not further illustrated here with solar elements, which respectively generate a charging current for the batteries 6, 6', 6" received in the battery housing 8.

In addition, a refrigerating unit 17, which produces refrigerating air in a way not further illustrated and injects it into the cargo body 3, is disposed above the driver's cab 2. By virtue of the arrangement of the refrigerating unit 17 above the driver's cab 2, the exhaust heat of the refrigerating unit 17 is dissipated to the environment of the electric truck 1. In other respects, the driver's cab 2 is equipped with an antenna unit 9, which, for example, may likewise be disposed above the driver's cab 2, for establishment of a wireless communication, in order to transmit relevant vehicle data, for example concerning the inside temperature of the cargo body 3, the charging condition of the batteries 6, 6', 6" received in the battery housing 8 and other vehicle data to a remotely disposed data-processing unit for achievement of a fleet management.

Figure 2:
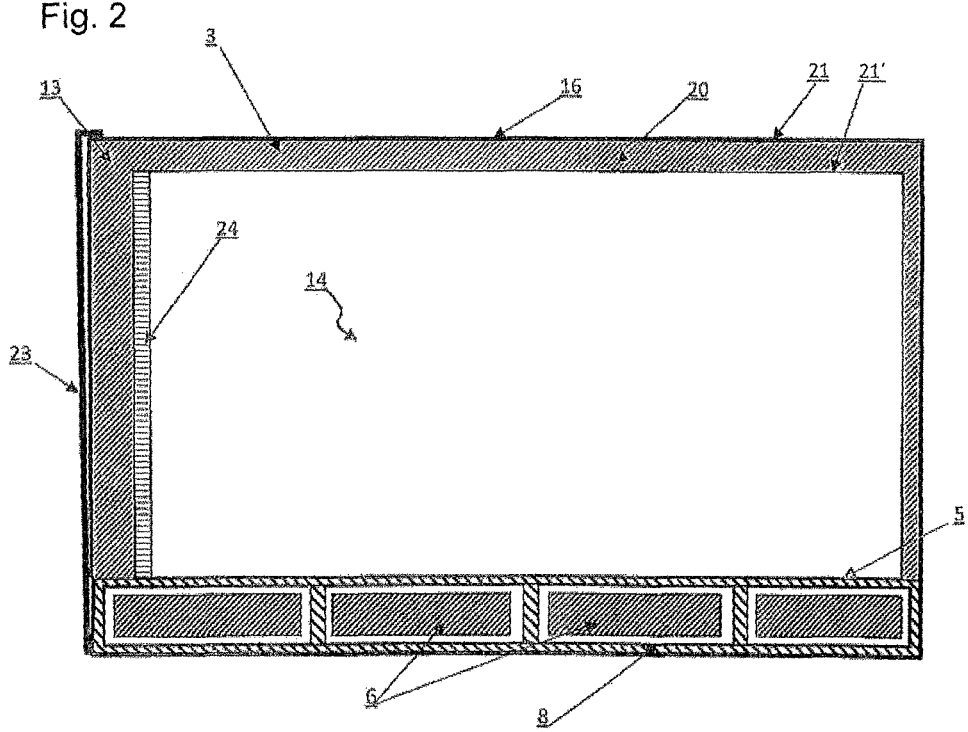
FIG. 2 shows the cargo body of the electric truck illustrated in FIG. 1 in a cross-sectional view.

According to the detailed view of the cargo body 3 in FIG. 2, both the front wall 13 and the side walls 14, the liftgate 15 and the top element 16 of the cargo body 3 are respectively made in a sandwich construction, wherein the stable wall elements, which advantageously are made in lightweight construction and are respectively equipped with a braced vacuum insulation consisting of a microporous or nanoporous filling material 20, simultaneously have a bracing and an insulating function. For this purpose, this filling material 20 is lined on both sides with suitable top or cover panels 21, 21' and, after these panels have been sealed vacuum-tight, the porous filling material 20 is evacuated via a suitable valve, not further illustrated here, so that at least a slight vacuum is generated in the interior region of the shell of the cargo body 3 explained in the foregoing and hereby an additional insulating effect is achieved.

For improvement of the refrigerating properties of the electric truck 1, the front wall 13 is equipped on the side facing the interior of the cargo body 3 with a large-area refrigerating surface 24, wherein the refrigerating surface 24 is integrated in the front wall 13.

Analogously, the battery housing 8 is also made in sandwich construction, wherein the walls of the battery housing 8 are likewise formed as braced vacuum insulation.

In this connection, both the cargo body 3 and the battery housing 8 disposed underneath the cargo body 3 are firmly joined to one another as a closed unit by means of a connecting element 23 spanning both the battery housing 8 and the cargo body 3 at least in portions.

Figure 3:
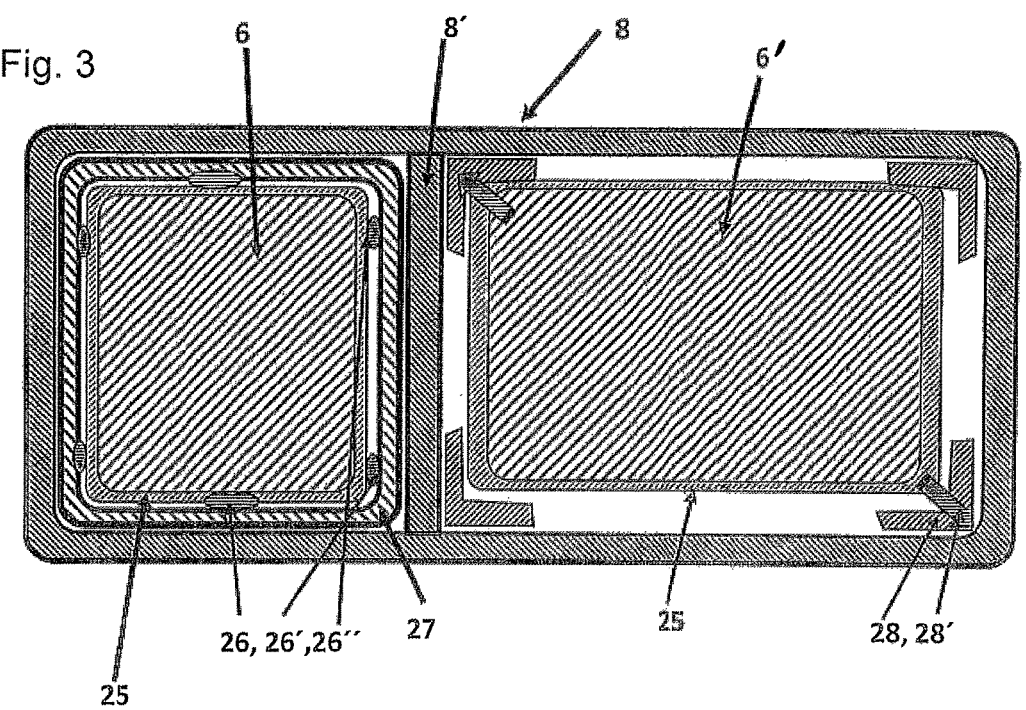
FIG. 3 shows battery housings with two battery modules in a cross-sectional view.

FIG. 3 shows a battery housing 8 with two batteries or battery modules 6, 6' in a cross-sectional view. In principle, the battery modules carried along in the vehicle are exposed to considerable stresses. The batteries, which weigh as much as several 100 kg, are exposed to extreme stresses of up to 80 g in connection with their registration. In this connection, the battery housing according to the invention described in the following already represents a very good protection for the batteries or battery modules received in the battery housing. It must then be ensured, however, that the batteries are securely fastened in the housing under all circumstances.

It is known from the prior art to group such battery cells including the electrical connections as modules, and then to join the individual modules by means of metallic rail systems or other fastening elements, which are respectively welded with the metallic inner walls of the battery housing, and to fix them in the housing. For this purpose, the spot-welded or line-welded joints must withstand relatively large forces in the stress situation and if necessary transmit considerable moments. The joints to be formed in this connection must be made very laboriously. In other respects, the already known fastening systems have a considerable dead weight.

In the solution illustrated in FIG. 3, the battery modules 6, 6' are installed interlockingly, protected against slipping, in a lightweight cage structure 25. Therein this cage is advantageously made from lightweight glass-fiber-reinforced plastic, abbreviated as GFRP. A further GFRP cage 27 is adhesively bonded over a large area in the battery housing 8 or 8'. After insertion of this module-cage unit 6, 25, this assembly is fixed in the installation position via interlocking and frictional clamping elements 26, 26' and 26". As clamping elements 26, 26' and 26" that are suitable in this connection, wedge-type slides, expander elements or subassemblies with a bayonet catch or similar catch can be considered.

In the same battery housing 8, an alternative fastening of a battery module 6' in the battery housing 8 is illustrated on the right side. In this case, expander elements 28, 28' are disposed directly on the cage 25. After the battery module 6' has been introduced into the battery housing 8, the expander elements 28, 28' are expanded in the intended manner and thus clamp the battery module 6' in its intended installation position inside the battery housing 8. In this connection, it is also conceivable to equip the inside wall of the battery housing 8 with corresponding beadings, into which the said expander elements 28, 28' then fit interlockingly.

The advantages of this last-described embodiment lie in a large-area transmission of force into the housing structure of the battery housing 8 without simultaneously causing concern about an overloading of the inner housing. In other respects, this solution may be made in lightweight construction. Moreover, at every point in time, a potential separation between battery 6, 6' and battery housing 8 is assured.

Figure 4:
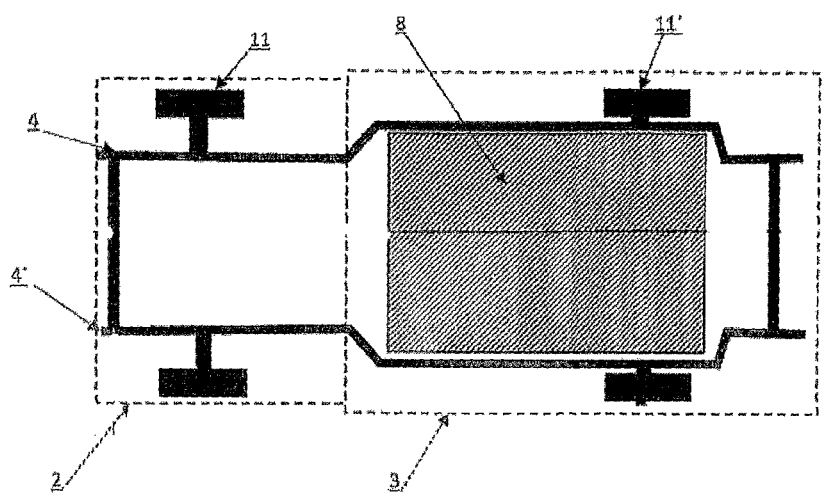
FIG. 4 shows an electric truck with a cargo body in a side view with battery housings disposed between the vehicle longitudinal beams in a side view.
Figure 5:
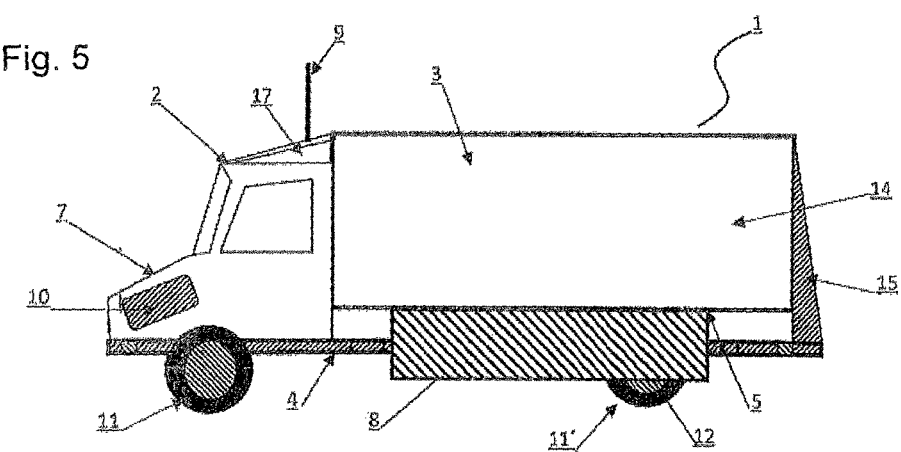
FIG. 5 shows the electric truck according to FIG. 4 in a side view at height of the vehicle longitudinal beams.

FIG. 4 shows an alternative embodiment of the electric truck 1 in such a way that the battery housing 8 is disposed in such a way between the vehicle longitudinal beams 4, 4' that the battery housing (8) projects below and above beyond the vehicle longitudinal beams 4, 4'. In this case the battery housing (8) is disposed, according to the sectional view illustrated in FIG. 5, between the vehicle longitudinal beams 4, 4'. This embodiment has the already mentioned advantages of a lower center of gravity of the electric truck 1 in conjunction with an increased crash safety for the battery or batteries received between the vehicle longitudinal beams.

In the foregoing, therefore, an electric truck 1 has been described in two different embodiments, which truck, by virtue of the arrangement of the batteries 6, 6', 6" respectively underneath the body bottom of the cargo body 3, has an improved roadholding, as well as opens up further advantages with respect to the battery management and in other respects is equipped with a cargo body 3 and a battery housing 8, both of which are equipped with a braced vacuum insulation, which contributes passively to effectively reducing the energy demand used for refrigeration of the cargo body 3 and in other respects the body bottom 5 of the cargo body 3 represented by the battery housing 8 already has the necessary bracing function and furthermore is of vacuum-insulated construction. The correspondingly equipped electric trucks 1 therefore have a greater range and can therefore be used in electricity-powered mode alone, so that they make an important contribution to reduction of the environmental pollution, for example due to fine dust, especially in the inner-city region.

Although only a few embodiments of the present invention have been shown and described, it is to be understood that many changes and modifications may be made thereunto without departing from the spirit and scope of the invention.

What is claimed is:

1. An electric truck comprising:
   (a) a chassis having a front region, a rear region, and first and second vehicle longitudinal beams;
   (b) a driver's cab resting on the front region;
   (c) a cargo body resting on the rear region having a substructure seated on the first and second longitudinal beams and a body bottom sealing an underside of the cargo body and disposed with an intermediate space above the first and second vehicle longitudinal beams to provide a clearance for spring travel; and
   (d) a battery housing with at least one integrated battery disposed in the intermediate space so that the battery housing and the cargo body form an enclosed unit joined with one another;
   wherein the body bottom is formed by a surface of the battery housing facing the cargo body;
   wherein the battery housing is adapted for load transfer and rests directly on the first and second vehicle longitudinal beams; and
   wherein the battery housing is an insulating housing with a double wall comprising an inner wall and an outer wall, wherein a microporous or nanoporous filling material, which is evacuated with formation of an at least partial vacuum, is disposed between the inner and the outer wall of the battery housing, and wherein the filling material has a bracing function, so that the battery housing is equipped with a braced vacuum insulation.

2. The electric truck according to claim 1, further comprising at least one driven vehicle axle and at least one electric motor, wherein the at least one electric motor is disposed in a motor compartment in the front region in front of and/or underneath the driver's cab, or wherein the at least one electric motor is disposed as at least one hub motor in the at least one driven vehicle axle.

3. The electric truck according to claim 1, wherein several batteries are spaced apart from one another in the battery housing.

4. The electric truck according to claim 3, wherein the battery housing is disposed between the first and second vehicle longitudinal beams so that the battery housing projects above and below the first and second vehicle longitudinal beams.

5. The electric truck according to claim 3, wherein the batteries in the battery housing are separated from one another by housing partitions.

6. The electric truck according to claim 4, wherein the batteries are received interlockingly in respective cages.

7. The electric truck according to claim 6, wherein the cages are made of lightweight, glass-fiber-reinforced plastic and are secured inside the battery housing by adhesive bonding or by a cage unit adhesively bonded inside the battery housing.

8. The electric truck according to claim 7, wherein the cage unit is secured inside the battery housing by interlocking and frictional clamping elements.

9. The electric truck according to claim 7, wherein the cages of the cage unit are secured via interlocking and frictional clamping elements braced directly against the battery housing.

10. The electric truck according to claim 3, wherein the battery housing is provided with several withdrawable units, and wherein the batteries can be inserted into the withdrawable units in such a way that, during insertion, each of the batteries can be directly connected via plug contacts disposed respectively in the withdrawable units.

11. The electric truck according to claim 10, further comprising an electric truck electrical system, wherein different voltage levels concerning a vehicle electrical system, a drive electrical system and a refrigeration electrical system are provided within the electric truck electrical system, wherein each withdrawable unit of the battery housing is respectively associated with one of the different voltage levels and is equipped with a corresponding battery of the several batteries.

12. The electric truck according to claim 11, wherein the separate withdrawable units are respectively equipped with individual plug couplings for connection of the corresponding batteries and the batteries in turn are respectively equipped with plugs corresponding to the individual plug couplings.

13. The electric truck according to claim 3, wherein the cargo body comprises side walls, a top element, and a liftgate and is formed as a sandwich element in such a way that at least one of the side walls, the top element and the liftgate has an inner wall and an outer wall, wherein a braced vacuum insulation is disposed between the inner wall and the outer wall.

14. The electric truck according to claim 13, wherein the liftgate is formed as a part of the chassis or as a part of the cargo body.

15. The electric truck according to claim 13, wherein at least one of the side walls of the cargo body is equipped on an inside wall facing an interior of the cargo body with a refrigerating surface.

16. The electric truck according to claim 13, wherein the sandwich element has first and second sides lined with cover panels.

17. The electric truck according to claim 13, wherein at least one of the top element and the side walls of the cargo body is lined on an outside portion with solar modules for ensuring during travel operation a recharging of the batteries received in the battery housing.

18. The electric truck according to claim 1, further comprising at least one electrical refrigerating unit associated with the cargo body.

19. The electric truck according to claim 18, wherein the at least one refrigerating unit is disposed on a roof of the driver's cab underneath the body bottom.

20. The electric truck according to claim 1, further comprising regenerative refrigeration elements associated with the cargo body.

21. The electric truck according to claim 1, wherein the electric truck is adapted to be connected to a data-acquisition unit for sensing vehicle data of the electric truck and transmitting the vehicle data wirelessly to a central computer for fleet management of the electric truck with other connected electric trucks.

22. An electric truck comprising:
(a) a chassis having a front region, a rear region, and first and second vehicle longitudinal beams;
(b) a driver's cab resting on the front region;
(c) a cargo body resting on the rear region having a substructure seated on the first and second longitudinal beams and a body bottom sealing an underside of the cargo body and disposed with an intermediate space above the first and second vehicle longitudinal beams to provide a clearance for spring travel; and
(d) a battery housing with at least one integrated battery disposed in the intermediate space between the first and second vehicle longitudinal beams and underneath the body bottom so that the battery housing and the cargo body form an enclosed unit joined with one another;
wherein the body bottom is formed by a surface of the battery housing facing the cargo body;
wherein the battery housing is adapted for load transfer; and
wherein the battery housing is an insulating housing with a double wall comprising an inner wall and an outer wall, wherein a microporous or nanoporous filling material, which is evacuated with formation of an at least partial vacuum, is disposed between the inner and the outer wall of the battery housing, and wherein the filling material has a bracing function, so that the battery housing is equipped with a braced vacuum insulation.

* * * * *